United States Patent
Balhoff et al.

(10) Patent No.: US 8,140,686 B2
(45) Date of Patent: Mar. 20, 2012

(54) DETECTION OF REQUIRED PASSWORD AUTHENTICATION IN A NETWORK

(75) Inventors: Kristen M. Balhoff, Morrisville, NC (US); Sarah A. Nelson, Raleigh, NC (US); Stephanie L. Walter, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 93 days.

(21) Appl. No.: 12/478,058

(22) Filed: Jun. 4, 2009

(65) Prior Publication Data

US 2010/0312904 A1    Dec. 9, 2010

(51) Int. Cl.
 G06F 15/16 (2006.01)
 G06F 7/04 (2006.01)
 G06F 12/14 (2006.01)

(52) U.S. Cl. .............. 709/227; 709/229; 726/2; 726/4; 726/19

(58) Field of Classification Search .................. 709/227, 709/229; 726/2, 4, 17, 19
See application file for complete search history.

(56) References Cited

U.S. PATENT DOCUMENTS

| | | | |
|---|---|---|---|
| 7,624,437 B1* | 11/2009 | Fagundo et al. | 726/15 |
| 2005/0220099 A1* | 10/2005 | Igarashi | 370/389 |
| 2007/0105623 A1* | 5/2007 | Tanaka et al. | 463/29 |
| 2009/0249439 A1* | 10/2009 | Olden et al. | 726/1 |
| 2010/0107225 A1* | 4/2010 | Spencer et al. | 726/4 |
| 2011/0065417 A1* | 3/2011 | McDonald et al. | 455/410 |

* cited by examiner

Primary Examiner — Joseph Avellino
Assistant Examiner — Aftab Nasir Khan
(74) Attorney, Agent, or Firm — Law Office of Jim Boice

(57) ABSTRACT

A client device interrogates an access point on a network to request an initial connection to the network. Without using a browser, the client device determines if the connection failed due to a lack of authorization for the client device to connect to the network.

14 Claims, 3 Drawing Sheets

DETECTION OF REQUIRED PASSWORD AUTHENTICATION IN A NETWORK

BACKGROUND

The present disclosure relates to the field of computing devices, and specifically to computer networks that are used by computing devices.

While early computing devices were stand-alone machines that operated autonomously, modern computing devices often utilize resources that are found on a network. These modern computing devices may be computers, smart phones, personal digital assistants (PDAs), or any other device that can be coupled, either by hard-wiring or wirelessly, to the network.

BRIEF SUMMARY

A client device interrogates an access point on a network to request an initial connection to the network. Without using a browser, the client device determines if the connection failed due to a lack of authorization for the client device to connect to the network.

DETAILED DESCRIPTION

Figure 1:
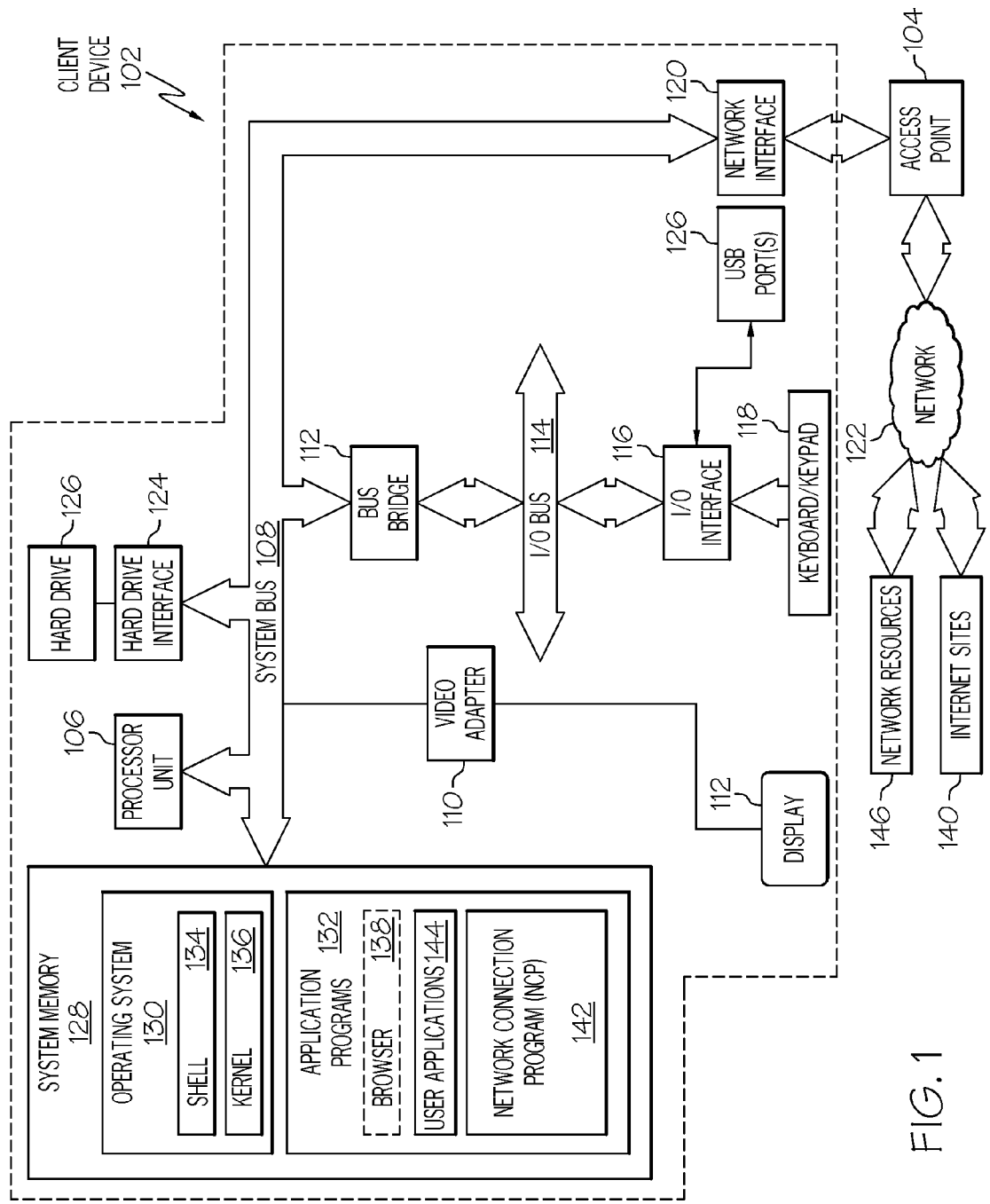
FIG. 1 depicts an exemplary suitably configured client device that may be utilized in the present invention.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java (JAVA is a registered trademark of Sun Microsystems, Inc. in the United States and other countries), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary client device 102, which may be utilized as a component in the present invention. Note that some or all of the exemplary architecture, including both depicted hardware and software, shown for and within client device 102 may be utilized by an access point 104.

Client device 102 includes a processor unit 106 that is coupled to a system bus 108. Processor unit 106 may utilize one or more processors, each of which has one or more processor cores. A video adapter 110 drives/supports a display 112, which is an output display that is also coupled to system bus 108. System bus 108 is coupled via a bus bridge 112 to an input/output (I/O) bus 114. An I/O interface 116 is coupled to I/O bus 114. I/O interface 116 affords communication with various I/O devices, including but not limited to a keyboard/keypad 118.

As depicted, client device 102 is able to communicate with access point 104 via a network interface 120. Access point 104 is an intelligent router that permits client device 102 to be connected to a network 122. Network 122 may be an external network such as the Internet, or an internal network such as an Ethernet or a virtual private network (VPN). In one embodiment, client device 102 is a wireless device. As such, then access point 104 utilizes any appropriate wireless protocol to communicate with client device 102, including but not limited to the protocol defined by the IEEE 802.11x standards.

A hard drive interface 124 is also coupled to system bus 108. Hard drive interface 124 interfaces with a hard drive 126, which in other embodiments may be a flash drive or any other device capable of mass storage of data. In a preferred embodiment, hard drive 126 populates a system memory 128, which is also coupled to system bus 108. System memory is defined as a lowest level of volatile memory in client device 102. This volatile memory includes additional higher levels of volatile memory (not shown), including, but not limited to, cache memory, registers and buffers. Data that populates system memory 128 includes client device 102's operating system (OS) 130 and application programs 132.

OS 130 includes a shell 134, for providing transparent user access to resources such as application programs 132. Furthermore, OS 130 is able to access non-web-based resources found on network 122, including network resources 146 as described below. Generally, shell 134 is a program that provides an interpreter and an interface between the user and the operating system. More specifically, shell 134 executes commands that are entered into a command line user interface or from a file. Thus, shell 134, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 136) for processing. Note that while shell 136 is a text-based, line-oriented user interface, the present invention will equally well support other user interface modes, such as graphical, voice, gestural, etc.

As depicted, OS 130 also includes kernel 136, which includes lower levels of functionality for OS 130, including providing essential services required by other parts of OS 130 and application programs 132, including memory management, process and task management, disk management, and mouse and keyboard management.

In one embodiment, application programs 132 include a renderer, shown in exemplary manner as a browser 138. Note that browser 138 is shown outlined with a dashed line, indicating that in one embodiment of the present invention, browser 138 is not available to client device 102 when client device 102 is initially attempting to connect to network 122. Nonetheless, browser 138, when utilized after client device 102's initial attempt to connect to network 122, includes program modules and instructions enabling a world wide web (WWW—"web") client (i.e., client device 102) to send and receive network messages to the Internet using hypertext transfer protocol (HTTP) messaging, thus enabling communication with Internet sites 140, which may be websites on the web. Non-web sites identified by non-URL (uniform resource locator) addresses (network resources 146), however, may be directly accessed by OS 130 without using browser 138.

Application programs 132 in client device 102's system memory also include a network connection program (NCP) 142. NCP 142 includes code for implementing the processes described below, including those described in FIGS. 2*a-c*.

Another component of application programs 132 are user applications 144. User applications 144 are client applications that are not needed by client device 102 to connect to network 122. As described in the novel process described below, when a user initially attempts to connect to network 122 without using browser 138, the user can utilize user applications 144 even if the client device 102 is not coupled to network 122. However, if an application from the user applications 144 (e.g., an e-mail application or another resource from network resources 146) needs to access such network resources 146, the user of that application will be unaware of the fact that this user application is not in communication with the requisite network resource. For example, the user may think that she is "sending" out new e-mails, while in fact these new e-mails are sitting unsent within the client device. Without utilizing the present invention, the user may never know of this condition.

The hardware elements depicted in client device 102 are not intended to be exhaustive, but rather are representative to highlight essential components required by the present invention. For instance, client device 102 may include alternate memory storage devices such as magnetic cassettes, digital versatile disks (DVDs), Bernoulli cartridges, and the like. These and other variations are intended to be within the spirit and scope of the present invention.

Figure 2A:
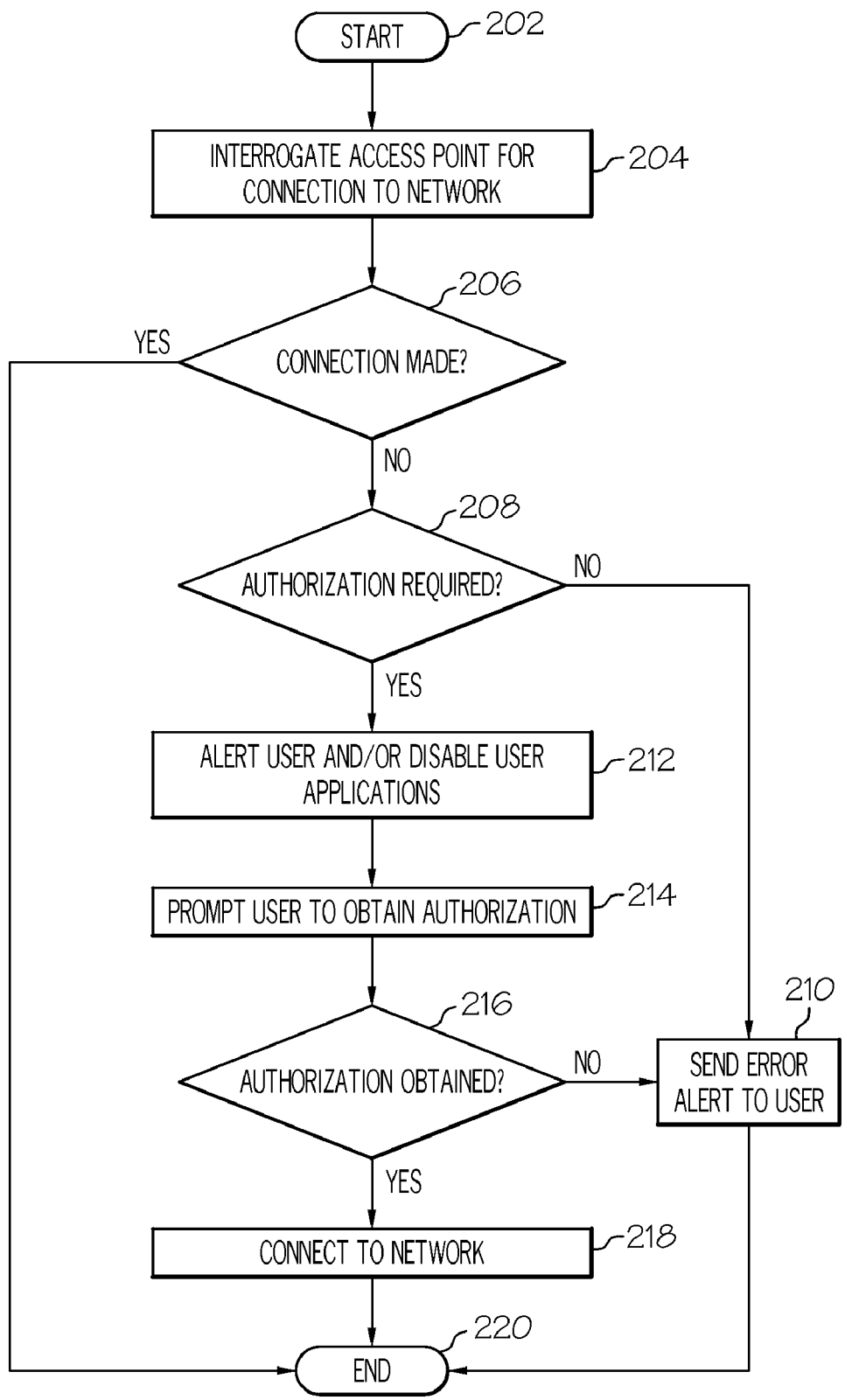
FIG. 2a is a high-level flow-chart of exemplary steps taken to couple a client device to a network without directly using a browser.

With reference now to FIG. 2*a*, a high-level flow-chart of exemplary steps taken by and/or with the use of an appropriately configured hardware system (e.g., client device 102 and/or access point 104 shown in FIG. 1) to connect a client device to a network is presented. After initiator block 202, which may be prompted by a user utilizing user applications within a client device such as a wireless PDA, laptop, smart cell phone, etc., the client device interrogates an access point for a network (block 204). This interrogation requests a connection between the client device and the network without the client device initially utilizing a browser.

Again, note that in one embodiment of the present invention that the client device does not initially utilize a browser when connecting to the network. If the client device were to initially utilize a browser, and if authorization (e.g., a login to an account, etc.) were required to access the network, then the browser would cause the user to view a login page for accessing the network. However, if the client device does not initially utilize a browser (as is common with smart cell phones, PDAs, etc.), then the user never sees this redirection to the login page, and assumes that she is connected to the network when she actually is not. Note that the client device (e.g., client device 102 shown in FIG. 1) is able to communicate with the access point (access point 104) even when it is unable to connect to the network (network 122).

Continuing with FIG. 2*a*, if a connection between the client device and the network is successful (query block 206), then no authorization or other login processes were required of the user, and the process ends (terminator block 220). However, if the connection is not made (query block 206), then a query is made (query block 208) to the access point of the network to determine if authorization (e.g., login) is required to access the network. If not, then some error other than a lack of authorization has occurred, and an appropriate error alert (e.g., indicating a lack of network bandwidth, that network is "down", etc.) is sent to the user of the client device (block 210). However, if the problem is that client device does not currently have the necessary authorization to access the network (query block 208), then the user is alerted and, optionally, user applications (e.g., user applications 142, shown in FIG. 1, which are not used to access the network) are disabled (block 212). In one embodiment, this user application disablement is only temporary, such that the user applications are re-enabled, either manually or automatically, once the client device successfully connects to the network.

The process of determining whether authorization (e.g., a password) is needed for the client device to connect to the network, as depicted in query block 208, can be performed by the access point and/or the client device. That is, in one embodiment, the access point recognizes that the client device was unable to connect to the network, due to a lack of authorization (e.g., entry of a proper password by the user of the client device), and "knows" that the network requires a password in order to be accessed. In this embodiment, the access point can simply send a message to the client device alerting the client device that a proper login is needed.

In another embodiment, the client device takes the initiative in determining whether or not authorization is required for connecting to the network. As described above, the client device is not configured to utilize a browser during the network connection process, and thus is not able to automatically receive and/or perceive a redirection to a login page (thus alerting the user that a login is required). Therefore, the client device utilizes a novel process to determine if a login/authorization is required. Two exemplary novel processes for accomplishing this are shown in FIGS. 2*b*-*c*, which depict exemplary subprocesses taken by the client device to perform the query described in query block 208.

Figure 2C:
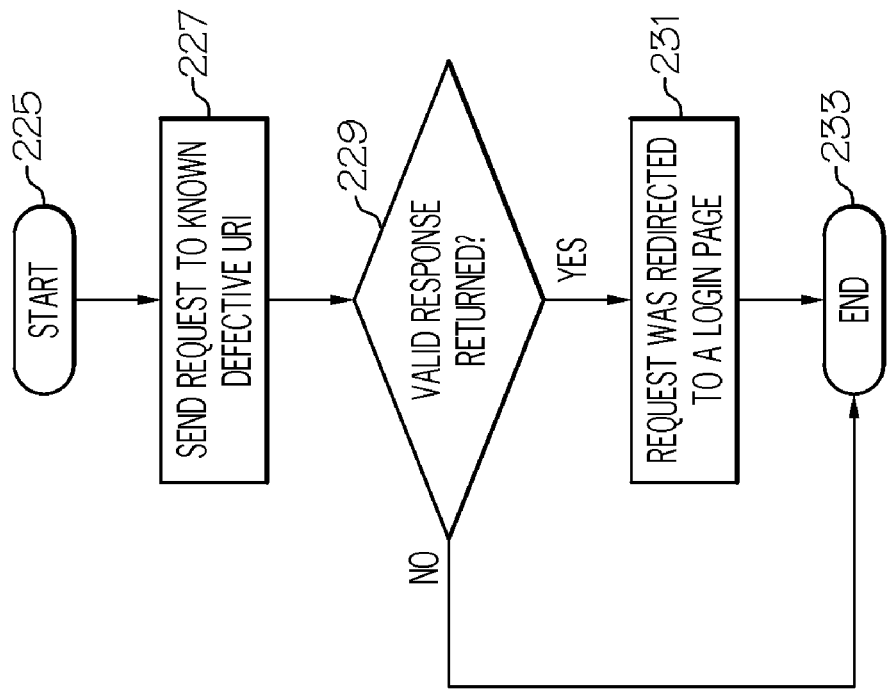
FIGS. 2b-c are high-level flow-charts that describe exemplary steps taken by a client device to determine if authorization is required to access the network.
Figure 2B:
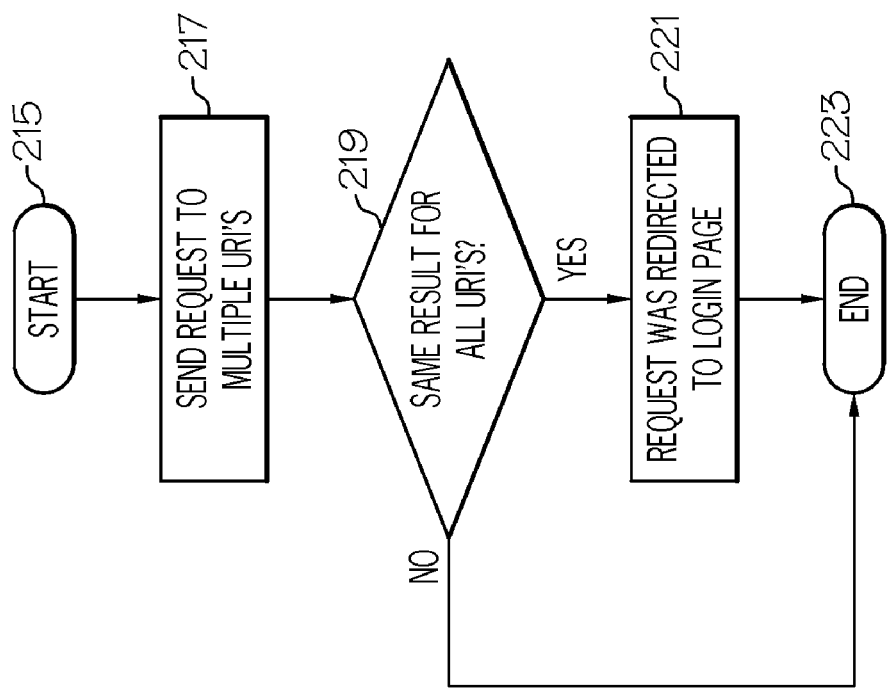

Referring now to FIG. 2*b*, after initiator block 215 (prompted by the client device attempting to access a network without using a browser), the client device sends a request for resources from multiple user resource indicators (URIs). While a URL is a type of URI that is specific for the web, in the action described in block 217 the client device sends a request to a non-URL location (since the client device is not using a browser). The URI may be a hyper-text transfer protocol (HTTP) address, a file transfer protocol (FTP) address, a media access control (MAC) address of a hardware device, or any other non-browser protocol address used to locate resources on a network, including the Internet. If a same message is returned to the client device for all of the multiple URIs (query block 219), then the user of the client device can assume that the attempt to connect to the network failed. One example of the same message is simply an error message, such as "connection failed." Another example of a same message is an "http error" or other protocol error message, which suggests that the request was redirected to a login webpage that the client device (which does not currently have an enabled browser running) cannot "see." In this scenario, the client device/user can assume that the error message was caused by a redirection to a web-based login/authorization location (block 221). That is, even though the client device cannot yet "see" the login page (assuming that the login page is a webpage with a URL address) due to the non-use of a browser, the user can still assume that some type of authorization process is required to connect to the network due to the protocol error message. This subprocess then terminates at terminator block 223.

In another embodiment, the subprocess used by the client device to determine if authorization for connecting to the network is required (query block 208 shown in FIG. 2*b*) is represented in FIG. 2*c*. After initiator block 225 (prompted by the client device attempting to access a network without using a browser), the client device sends a request for a resource located at a known defective URI (block 227). This known defective URI is an invalid address that is unable to present resources to any requester. Nonetheless, if a valid response is returned (query block 229), then the user and/or client device concludes that the request to the defective URI was automatically directed to a valid login page. This valid response is a message that the attempt to connect with the defective URI was "successful", even though the client device may not be able to "see" the login page without a running browser. However, since the user knows that such a connection is not possible, then the user can conclude that the "successful connection" was actually an automatic redirection to a login page (block 231), and the process ends (terminator block 233).

Returning again to FIG. 2*a*, and particularly to block 212, the user of the client device is presented with an alert (either from the access point or as a self-generated message from the client device) that the network requires authorization in order to be accessed. Furthermore, all user applications (client applications) on the client device that are not required for making a connection to the network are disabled (block 212). This prevents the user from performing useless work (e.g., making unused inputs, etc.) with a user application. Furthermore, the disablement of the user applications will provide the user with an additional and/or alternative alert that something is amiss with the network connection (which the user previously had assumed to have been made).

The user, either from the express alert or by noticing that the user applications have been disabled, is thus prompted to obtain authorization to access the network (block 214). If the user fails in her attempt to obtain authorization to connect to the network, then she is so notified (block 210) and the process ends (terminator block 220). However, if the user is able to obtain authorization, then she is connected to the network (218). At this point in the process, the browser on the client device can be enabled, in order for the client device to be able to access a webpage used to log in to the network. Otherwise, the user obtains login authorization from some non-web-based resource.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method comprising:
    transmitting an interrogation to an access point on a network, wherein the interrogation is transmitted by a client device that is suitably configured to request a connection to the network, and wherein the interrogation requests the connection between the client device and the network without the client device initially utilizing a browser;
    determining if an authorization for the client device is required before connecting the client device to the network, wherein said determining if the authorization for the client device is required before connecting to the network is performed by the client device:
        transmitting a request for a connection to a known defective uniform resource identifier (URI), wherein the known defective URI is an invalid address that is unable to present resources to any requester; and
        receiving a valid response to the request for the connection to the known defective URI, wherein the valid response indicates that the request to the known defective URI was automatically directed to a valid login page;
    in response to determining that the authorization for the client device is required before connecting the client device to the network, obtaining, by the client device, authorization to connect the client device to the network; and
    in response to determining that the authorization for the client device is required before connecting the client device to the network, disabling any user applications on the client device that are not needed for establishing the connection to the network, wherein the user applications remain disabled until the client device is connected to the network.

2. The method of claim 1, wherein said determining if the authorization for the client device is required before connecting to the network is performed by the client device:
    transmitting, from the client device, requests for resource s that are identified by multiple uniform resource identifiers (URIs); and
    in response to the requests being redirected to a login page, receiving a same error message at the client device for all of the requests, wherein the same error message enables a user of the client device to conclude that the requests were redirected to a web-based resource that the client device cannot process without an active browser, and wherein the error message enables the user to determine that authorization for the client device is required before connecting the client device to the network.

3. The method of claim 1, wherein the client device is a wireless device and the network is a wireless network.

4. The method of claim 1, further comprising:
    in response to the client device obtaining authorization to connect to the network, connecting the client device to the network via the access point.

5. A method comprising:
    receiving, by a hardware access point that is suitably configured to provide a client device access to a network, an interrogation, wherein the interrogation requests a connection between the client device and the network without the client device initially utilizing a browser;
    determining if an authorization for the client device is required before connecting to the network by the hardware access point:
        receiving, from the client device, a request for the connection to a known defective uniform resource identifier (URI), wherein the known defective URI is an invalid address that is unable to present resources to any requester; and
        transmitting a valid response to the client device, wherein the valid response indicates to the client device that the request was automatically redirected to a valid login page;
    in response to determining that the authorization for the client device is required before connecting the client device to the network, transmitting an alert to the client device, wherein the alert informs the client device that the connection between the client device and the network failed; and
    in response to receiving authorization from the client device, connecting the client device to the network.

6. The method of claim 5, further comprising:
    in response to determining that the authorization for the client device is required before connecting the client device to the network, transmitting a disabling signal to the client device, wherein the disabling signal disables any user applications on the client device that are not needed to connect the client device to the network.

7. The method of claim 5, wherein the client device is a wireless device and the network a wireless network.

8. The method of claim 5, further comprising:
in response to the client device obtaining authorization to connect to the network, connecting the client device to the network via the hardware access point.

9. A computer program product for connecting a client device to a network, the computer program product comprising:
a non-transitory computer usable medium having computer usable program code embodied therewith, the computer usable program code comprising:
computer usable program code configured to transmit an interrogation to an access point on a network, wherein the interrogation is transmitted by a client device that is suitably configured to request a connection to the network, and wherein the interrogation requests the connection between the client device and the network without the client device initially utilizing a browser;
computer usable program code configured to determine if an authorization for the client device is required before connecting the client device to the network by:
transmitting a request for a connection to a known defective uniform resource identifier (URI), wherein the known defective URI is known by a user of the client device to be an invalid address that is unable to present resources to any requester; and
receiving a valid response to the request for the connection to the known defective URI, wherein the valid response indicates that the request to the known defective URI was automatically directed to a valid login page;
computer usable program code configured to, in response to determining that the authorization for the client device is required before connecting the client device to the network, transmit an alert to a user of the client device; and
computer usable program code configured to, in response to the user receiving the alert, obtain, by the client device, authorization to connect to the network.

10. The computer program product of claim 9, further comprising:
computer usable program code, embodied on the non-transitory computer usable medium, configured to, in response to determining that the authorization for the client device is required before connecting to the network, disable any user applications on the client device that are not needed for establishing the connection to the network, wherein the user applications are disabled until the client device is connected to the network.

11. The computer program product of claim 9, further comprising:
computer usable program code, embodied on the non-transitory computer usable medium, configured to transmit requests from the client device for connections to resources that are identified by multiple uniform resource identifiers (URIs); and
computer usable program code, embodied on the non-transitory computer usable medium, configured to, in response to all of the requests being redirected to a login page, determine that authorization for the client device is required before connecting the client device to the network.

12. A system comprising:
a network; and
a hardware access point for connecting the network to client devices that do not initially utilize a browser to connect to the network, wherein the hardware access point:
receives an interrogation, wherein the interrogation requests a connection between a client device and the network without the client device initially utilizing a browser;
determines if an authorization for the client device is required before connecting to the network by:
receiving a request for a connection to a known defective uniform resource identifier (URI) wherein the known defective URI is known by a user of the client device to be an invalid address that is unable to resent resources to any requesters; and
transmitting a valid response to the request for the connection to the known defective URI, wherein the valid res wise indicates that the realest to the known defective URI was automatically directed to a valid login page;
in response to determining that the authorization for the client device is required before connecting the client device to the network, transmitting an alert to the client device, wherein the alert informs the client device that the connection between the client device and the network failed; and
in response to receiving authorization from the client device, connecting the client device to the network.

13. The system of claim 12, wherein the hardware access point:
transmits, in response to determining that the authorization for the client device is required before connecting the client device to the network, a disabling signal to the client device, wherein the disabling signal disables any user applications on the client device that are not needed for establishing the connection between the client device and the network.

14. The system of claim 12, wherein the client device is a wireless device and the network is a wireless network.

* * * * *